United States Patent [19]
O'Connor et al.

[11] Patent Number: 5,112,026
[45] Date of Patent: May 12, 1992

[54] FLUID DISCHARGE VALVE

[75] Inventors: Raymond J. O'Connor, Farnham; Nicholas C. Henly, Petersfield, both of England

[73] Assignee: Ferranti International plc, England

[21] Appl. No.: 765,002

[22] Filed: Sep. 24, 1991

[51] Int. Cl.⁵ .............................................. F16K 1/00
[52] U.S. Cl. ...................................... 251/63; 251/324; 251/900; 277/27
[58] Field of Search ................ 251/63, 324, 900; 277/27

[56] References Cited

U.S. PATENT DOCUMENTS

| | | | |
|---|---|---|---|
| 2,621,885 | 12/1952 | Schmitt | 251/63 |
| 2,778,598 | 1/1957 | Bolling, Jr. | 251/63 |
| 4,167,262 | 9/1979 | Lemmon | 251/63 |
| 4,173,327 | 11/1979 | Williams | 251/63 |

*Primary Examiner*—A. Michael Chambers
*Attorney, Agent, or Firm*—Larson and Taylor

[57] ABSTRACT

A valve which allows the rapid discharge of a fluid from a reservoir (13) to a working volume (12) includes a housing (10) and a cylindrical sleeve (14) movable axially within the housing between a closed position in which it separates the reservoir (13) from the working volume (12) and an open position in which the reservoir (13) communicates with the working volume (12). Sealing means (20, 21) are provided to prevent leakgage of the fluid when the sleeve is in the closed position. Actuating means are provided for moving the sleeve (14) between its two positions. The sealing means comprises seals (20, 21) located to engage one end (19) of the sleeve around the outer and inner peripheries respectively when the sleeve (14) is in the closed position. One seal (20) is forced into engagement with the sleeve (14) by the pressure of fluid in the reservoir (13) and the other seal (21) is forced into engagement with the sleeve (14) only when fluid pressure is applied by the actuating means to move the sleeve (14) from its closed position to its open position.

3 Claims, 3 Drawing Sheets

FLUID DISCHARGE VALVE

This invention relates to a fluid discharge of fluid from a reservoir to a working area.

Many types of apparatus are operated by fluid pressure and in a number of these it is necessary to transfer a large volume of fluid rapidly from a reservoir to a working area. This transfer is made possible by the use of a rapid action fluid discharge valve. It is usually equally necessary to ensure that fluid does not leak from the reservoir when the fluid discharge valve is closed.

One type of valve commonly used for this purpose comprises a cylindrical sleeve movable between two positions in which it allows or prevents communication between two spaces. One space is, or may communicate with, the reservoir whilst the other space is, or may communicate with, the working area. One example of such a valve is described in UK published patent application No. 2146416 (European published application No. 145132) which is concerned with a projectile launcher operated by a fluid such as compressed air. The remainder of this specification will describe a compressed air valve, it being understood that this is only one example of a suitable fluid.

In the system described in the above-mentioned publication a sleeve valve is used to allow air from a reservoir to communicate with a cylindrical barrel from which a projectile is to be launched the sleeve is generally coaxial with the barrel and in its closed position makes contact with an end face of what may be considered the breech of the launcher. The sleeve has a flange provided to increase the area of contact between the end of the sleeve and the end face of the breech and a seal is located in a circular groove in that end face to make sealing contact with the flange. The flange also provides a larger area at one end of the sleeve on which the air pressure in the reservoir may act to hold the sleeve in the closed position. The sleeve is moved from the closed position by air pressure acting on the flange so as to move the sleeve away from the end face, initial movement of the sleeve being increased by the resulting flow of air from the reservoir into the barrel. To prevent leakage of the air used to operate the valve a second seal is provided concentric with the first. This may be a second face seal or an 'O'-ring seal provided in a projection from the end face of the breach which fits inside the end of the sleeve.

The main problem encountered with the fluid valve described in the above-numbered publication is that of damage to the face seal or seals. The seal is located in its circular groove projecting slightly beyond the end face so that it is contacted by the flange on the sleeve. There has been found to be a tendency for the seal to adhere to the end face and be pulled out of its groove following which the seal is loose inside the mechanism and will impede subsequent operation. If an adhesive is used to retain the seal in its groove then the seal itself is often damaged or the bonding may fail over a period of time.

It is an object of the present invention to provide a fluid discharge valve of the type described above having an improved sealing arrangement.

According to the present invention there is provided a fluid discharge valve operable to allow the rapid discharge of a fluid from a reservoir to a working volume, which valve includes a housing, a cylindrical sleeve movable axially within the housing between a closed position in which it separates the reservoir from the working volume and an open position in which the reservoir communicates with the working volume, sealing means arranged to prevent leakage of fluid from the reservoir to the working volume when the sleeve is in the closed position, and valve actuating means for moving the sleeve between its two positions, the sealing means comprising first and second concentric seals located so as to engage an end of the sleeve around the outer and inner periphery respectively thereof when the sleeve is in the closed position, the first seal being forced into engagement with the sleeve by the pressure of fluid in the reservoir and the second seal being forced into engagement with the sleeve only when fluid pressure is applied by the actuating means to move the sleeve from its closed position to its open position.

The invention will now be described with reference to the accompanying drawings, in which.

Figure 1:
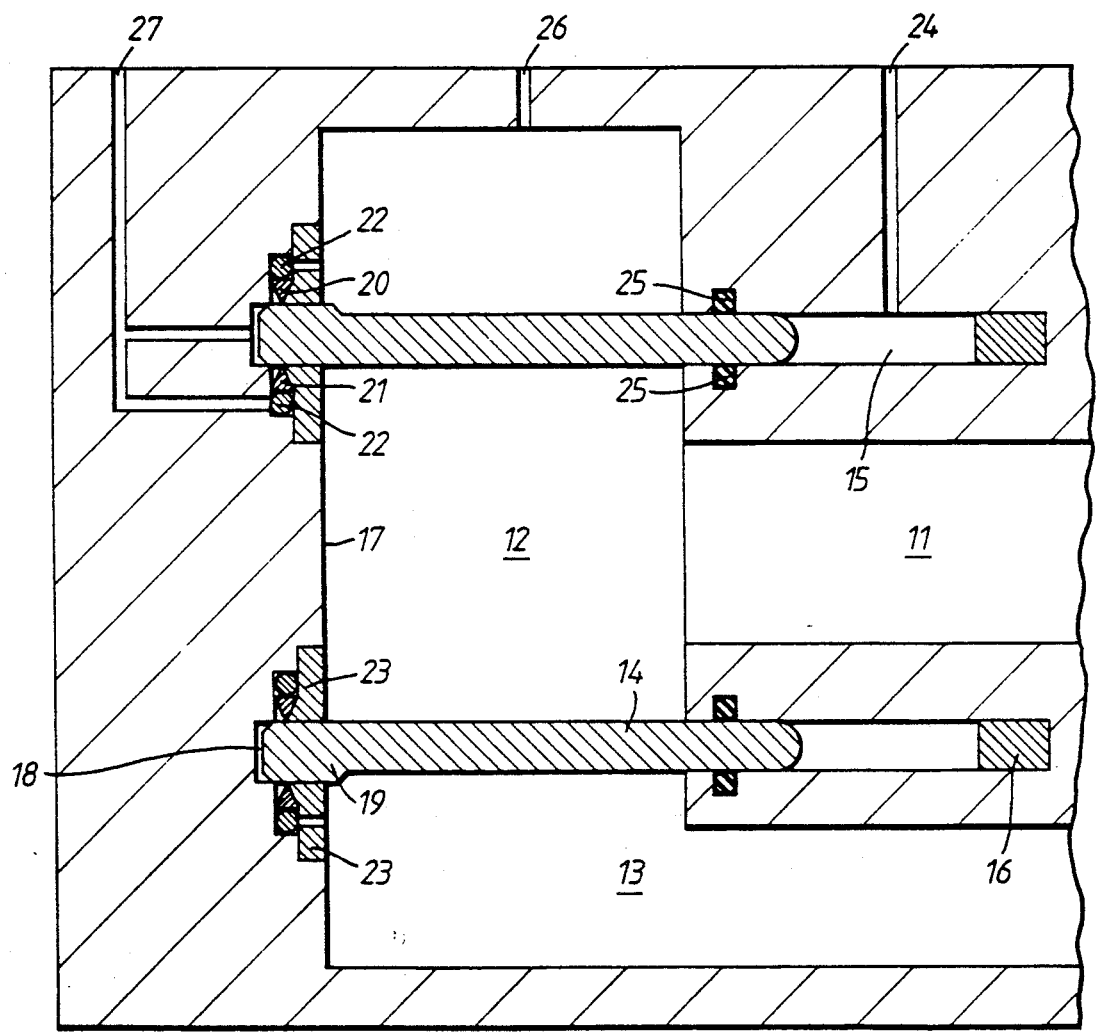
FIG. 1 is a schematic sectional view of an embodiment of the invention.

Referring now to FIG. 1, this shows a schematic sectional view of part of the housing 10 of a compressed-air projectile launcher and in particular the fluid valve which operates the launcher. The barrel 11 extends from a chamber 12 which is separated from a fluid reservoir 13 by a slidable sleeve 14. The sleeve is slidable axially in a slot 15 between the closed position shown and an open position in which the chamber 12 is in communication with the reservoir 13. A resilient buffer 16 is located at the bottom of slot 15. The volume of the reservoir 13 may be increased by utilising a space surrounding the barrel 11.

The end face 17 of the chamber 12 houses seals for the end of the sleeve which is, in the closed position, accommodated in a circular slot 18 formed in the end face. The end of the sleeve 14 is formed with an enlargement 19 and seals 20 and 21 are provided to engage the outer and inner surfaces respectively of that enlargement 19. Each seal has associated with it an energising ring 22 and each seal is retained in position in the end face 17 by a retaining ring 23.

The sleeve 14 is moved to the closed position shown by admitting a fluid such as air under pressure through an inlet 24 into slot 15. Leakage of air past the sleeve is prevented by seals 25. The reservoir 13 is charged with a fluid, such as air, under pressure through an inlet 26 and may be charged to any required pressure. Finally, the sleeve is moved to its open position by admitting air under pressure through inlet 27.

The retaining ring 23, which holds the outer seal 20 in place, is provided with apertures 28 which allow air in the reservoir 13 to exert pressure on the first energising ring 22 and hence ensure a satisfactory seal with the outer surface of sleeve 14. Similarly, when pressure is applied through inlet 27 a second energising ring 22 forces seal 21 into engagement with the inner surface of sleeve 14.

Figure 2:
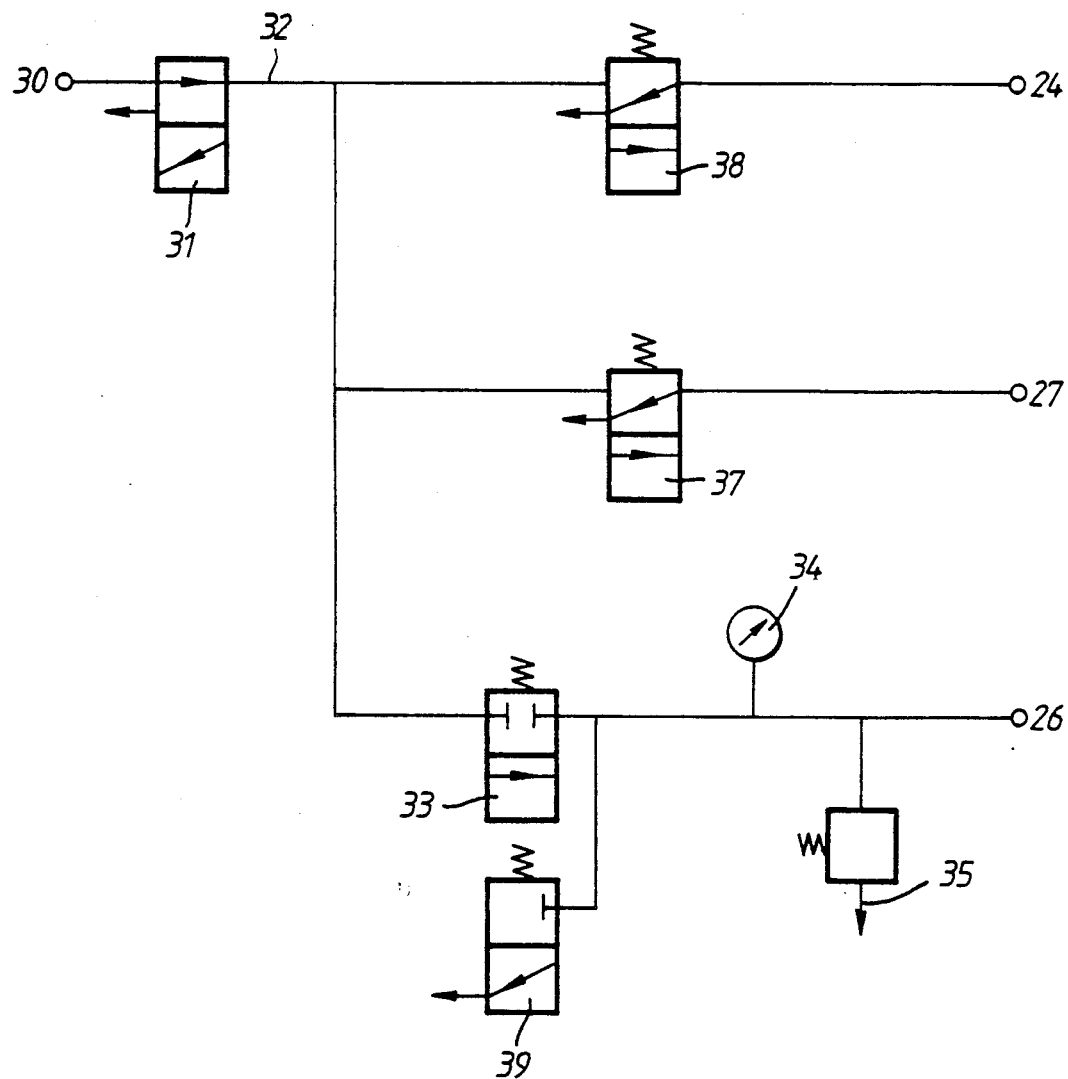
FIG. 2 is a schematic diagram of a suitable actuating arrangement for the valve of FIG. 1.

FIG. 2 shows a suitable operating arrangement for the valve. A source of compressed air, such as a compressor or a supply reservoir, is connected to a connection 30 of the circuit. A two-way valve 31 connects the source to a line 32 connected to three valves. A valve 33 allows compressed air to be admitted via inlet 26 to the reservoir of the projectile launcher and pressure gauge 34 allows the pressure in that reservoir to be adjusted. A pressure-relief safety valve 35 is provided. Pressure line 32 is also connected via a valve 37 to inlet 27 on the launcher. The valve 37 normally connects the inlet to atmosphere but allows compressed air to be applied when the valve is actuated. Finally, pressure line 32 is connected via a further valve 38 to inlet 24. Again the valve connects inlet 24 to atmosphere when in its normal position.

The second position of valve 31 allows line 32 to be connected to atmosphere when it is required to release the pressure in line 32. A valve 39 is operatable to release the air in the reservoir to atmosphere.

The fluid valve described above is operated in the manner described below.

Compressed air is first admitted through valve 38 and inlet 24 to move the sleeve 14 to the closed position. Valve 33 then admits air through inlet 26 to the reservoir 13 which is charged to the required pressure. At the same time the air pressure acting on outer energising ring 22 forces seal 20 against the outer surface of the sleeve 14. Valve 38 may now be released since the pressure of air in the reservoir 13 holds the sleeve in the closed position.

To operate the sleeve 14, control valve 37 is operated to apply air through inlet 27 to the end face of sleeve 14. At the same time the inner energising ring forces seal 21 against the inner surface of sleeve 14 to prevent loss of the air pressure. The application of compressed air to its end surface causes sleeve 14 to move away from end face 17. As soon as the sleeve is clear of the end face the air under pressure in the reservoir 13 moves into the chamber 12 and causes the sleeve to move rapidly to its open position. This allows the air in the reservoir to move rapidly into the chamber to force out any projectile in the barrel 11.

Figure 3:
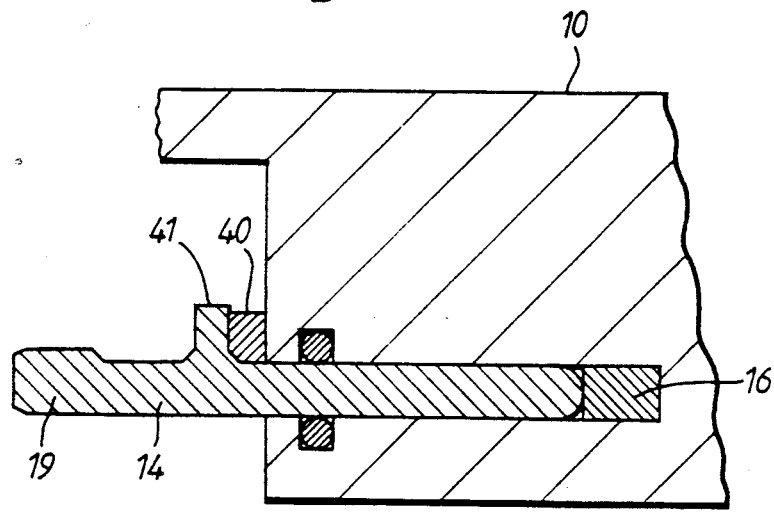
FIG. 3 illustrates a modification to the embodiment of FIG. 1.

Movement of sleeve 14 to the open position is stopped by the buffer 16. If necessary a further buffer 40 be carried on an outwardly-directed flange 41 on sleeve 14 as shown in FIG. 3, which shows part only of the sleeve 14 in the open position. The further buffer 40 is arranged to contact the surface of the housing adjacent to the slot 15, as shown.

Figure 4:
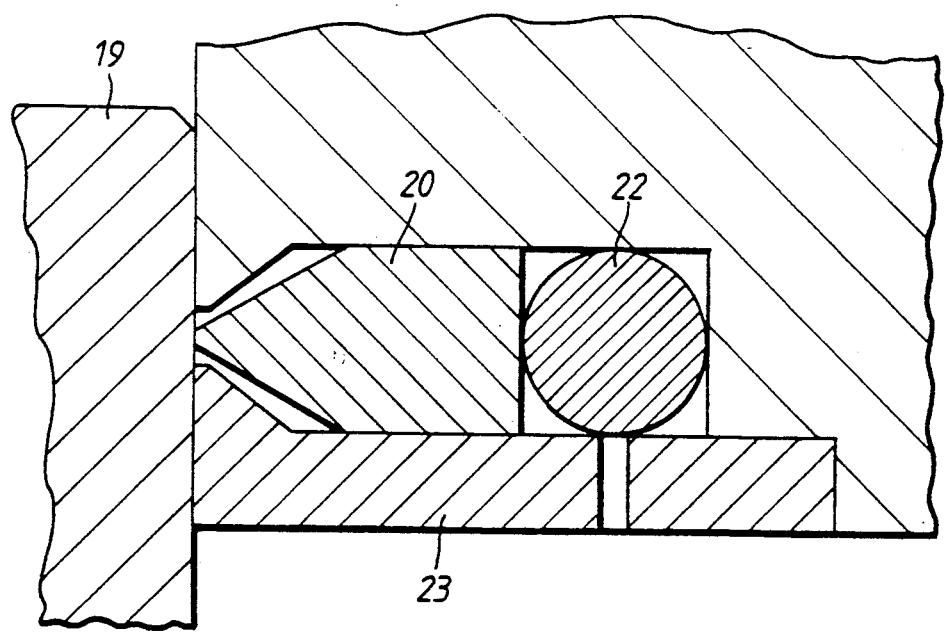
FIG. 4 is a detailed diagram of part of the embodiment of FIG. 1.

FIG. 4 shows, very much enlarged, one of the sleeve seals 20 (or 21) and its associated energising ring 22 and retaining ring 23 in greater detail. The seal 20 is formed from a suitable material such as ptfe and is shaped to contact the sleeve 14 over a relatively small area which increases as the seal wears down in use. The retaining ring 23 is formed with an inclined surface 45 which holds the seal in alignment as the sleeve moves away from its closed position but which allows the seal to move as wear takes place. It is during the opening of the valve that wear will occur since it is at this time that pressure is applied to the energising ring 22 to force the seal against the sleeve. The angles of the faces of the seal 20 and of inclined surface 45 are such as to permit the maximum movement of seal 20 to give the maximum seal life commensurate with satisfactory operation. However, the seal arrangement may be different from that shown.

As already stated the working fluid does not have to be compressed air. Equally, the apparatus with which the valve is used need not be a projectile launcher as described. The valve is suitable for use in many other situations where the rapid discharge of a fluid from a reservoir is required.

We claim:

1. A fluid discharge valve operable to allow the rapid discharge of a fluid from a reservoir (13) to a working volume (12), which valve includes a housing, a cylindrical sleeve (14) movable axially within the housing between a closed position in which it separates the reservoir (13) from the working volume (12) and an open position in which the reservoir (13) communicates with the working volume (12), sealing means (20, 21) arranged to prevent leakage of fluid from the reservoir (13) to the working volume (12) when the sleeve is in the closed position and valve actuation means for moving the sleeve (14) between its two positions, the sealing means comprising first and second seals (20, 21) located so as to engage one end (19) of the sleeve (14) around the outer and inner periphery respectively thereof when the sleeve is in the closed position, the first seal (20) being forced into engagement with the sleeve (14) by the presence of fluid in the reservoir (13) and the second seal (21) being forced into engagement with the sleeve only when fluid pressure is applied by the actuating means to move the sleeve (14) from its closed position to its open position.

2. A valve as claimed in claim 1 in which one end of the sleeve (14) is accommodated in the closed position in a slot (18) in an end face (17) of the housing (10), the sealing means being accommodated in the said end face.

3. A valve as claimed in claim 2 in which the sealing means includes a seal (20, 21) arranged to engage with the sleeve (14), an energising ring (22) responsive to fluid pressure to force the seal (20, 21) into engagement with the sleeve (14) and a retaining member (23) arranged to locate the seal and the energising ring in position in the end face (17).

* * * * *